(12) United States Patent
Gong et al.

(10) Patent No.: US 11,144,151 B1
(45) Date of Patent: Oct. 12, 2021

(54) TOUCH SENSING DEVICE AND ELECTRONIC DEVICE HAVING HYBRID SENSING STRUCTURE

(71) Applicant: Samsung Electro-Mechanics Co., Ltd., Suwon-si (KR)

(72) Inventors: Jung Chui Gong, Suwon-si (KR); Joo Yul Ko, Suwon-si (KR); Joo Hyoung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/943,132

(22) Filed: Jul. 30, 2020

(30) Foreign Application Priority Data

May 26, 2020 (KR) .......................... 10-2020-0063036

(51) Int. Cl.
  *G06F 3/041* (2006.01)
  *G06F 3/044* (2006.01)
  *H04M 1/02* (2006.01)

(52) U.S. Cl.
  CPC .......... *G06F 3/04144* (2019.05); *G06F 3/044* (2013.01); *H04M 1/026* (2013.01); *H04M 2250/22* (2013.01)

(58) Field of Classification Search
  None
  See application file for complete search history.

(56) References Cited

U.S. PATENT DOCUMENTS

| 4,697,050 A * | 9/1987 | Farel ....................... G06F 3/046 178/19.07 |
| 9,086,740 B2 * | 7/2015 | Furukawa ............. G06F 3/0338 |
| 2008/0191821 A1* | 8/2008 | Protze ................ H01H 33/6662 335/209 |
| 2009/0160789 A1* | 6/2009 | Kreit ....................... G06F 3/046 345/173 |
| 2011/0018556 A1* | 1/2011 | Le ....................... H03K 17/9622 324/654 |

(Continued)

FOREIGN PATENT DOCUMENTS

| JP | 2012-168747 A | 9/2012 |
| JP | 2015-62092 A | 4/2015 |

(Continued)

*Primary Examiner* — Matthew Yeung
(74) *Attorney, Agent, or Firm* — NSIP Law

(57) ABSTRACT

A touch sensing device includes: first and second touch sensor devices disposed on internal surfaces of first and second touch sensing members, respectively; a force sensor device spaced apart from an internal surface of a force sensing member; an oscillation circuit configured to generate a first oscillation signal, based on a change in capacitance in response to the first touch sensing member being touched; generate a second oscillation signal, based on a change in capacitance in response to the second touch sensing member being touched; and generate a third oscillation signal, based on a change in inductance depending on a change in spacing between the force sensing member and the force sensor device; and a touch detection circuit configured to adjust a threshold for force sensing through the force sensor device depending on positions of the first and second touch sensing members, based on the first and second oscillation signals.

24 Claims, 13 Drawing Sheets

(56) References Cited

U.S. PATENT DOCUMENTS

| | | | |
|---|---|---|---|
| 2011/0241442 A1* | 10/2011 | Mittleman | H03K 17/962 307/112 |
| 2014/0092056 A1* | 4/2014 | Jhou | G06F 3/0446 345/174 |
| 2015/0084896 A1 | 3/2015 | Sakayanagi et al. | |
| 2015/0130649 A1 | 5/2015 | Itakura et al. | |
| 2018/0081221 A1* | 3/2018 | Liu | G06F 3/0362 |
| 2018/0093695 A1 | 4/2018 | Hattori et al. | |
| 2018/0120364 A1 | 5/2018 | Lee et al. | |
| 2018/0218859 A1* | 8/2018 | Ligtenberg | G06F 3/0416 |
| 2019/0079632 A1* | 3/2019 | He | G06F 3/04162 |
| 2020/0387245 A1* | 12/2020 | Chen | G06F 3/0202 |

FOREIGN PATENT DOCUMENTS

| | | |
|---|---|---|
| JP | 2015-95865 A | 5/2015 |
| KR | 10-2002-0077836 A | 10/2002 |
| KR | 10-2009-0120709 A | 11/2009 |
| KR | 10-2010-0029421 A | 3/2010 |
| KR | 10-2011-0087004 A | 8/2011 |
| KR | 10-2011-0087014 A | 8/2011 |
| KR | 10-2018-0046833 A | 5/2018 |

\* cited by examiner

TOUCH SENSING DEVICE AND ELECTRONIC DEVICE HAVING HYBRID SENSING STRUCTURE

CROSS-REFERENCE TO RELATED APPLICATIONS

This application claims the benefit under 35 USC 119(a) of Korean Patent Application No. 10-2020-0063036 filed on May 26, 2020 in the Korean Intellectual Property Office, the entire disclosure of which is incorporated herein by reference for all purposes.

BACKGROUND

1. Field

The following description relates to a touch sensing device and an electronic device having a hybrid sensing structure.

2. Description of Related Art

In general, wearable devices have preferably been thinner, simpler and had neater designs, and thus existing mechanical switches are being eliminated, along with the implementation of dustproof and waterproof technologies, as well as the development of an integrated model with a smooth design.

Currently, technologies such as touch on metal (ToM) technology that implements touch inputs on metal, capacitor sensing technology using touch panels, micro-electro-mechanical-system (M EMS), and micro strain gauges are being developed. Furthermore, a force touch function is also being developed.

In the case of an existing mechanical switch, a large size the mechanical switch and a large internal space are required to implement the function(s) of the switch. Thus, there is disadvantage that the appearance of the wearable device may not be neat due to a shape protruding to the outside of an external case or the structure not being integrated with the external case, and the wearable device may occupy a relatively large space.

In addition, there is a risk of electric shocks due to direct contact with a mechanical switch that is electrically connected, and in particular, there is a disadvantage that it may be difficult to obtain waterproof and dustproof construction of the wearable device due to structural characteristics of the mechanical switch.

In addition, an existing touch sensing device having a touch switch unit that replaces a mechanical switch may include a hybrid structure including a plurality of capacitive sensors for touch sensing and inductive sensing for preventing malfunction.

In such a hybrid structure, unlike capacitive sensing by direct touch, inductive sensing is not directly touched and a touch sensing unit formed in the housing for capacitive sensing is formed based on the physical change of the housing upon direct touch. Therefore, there is a problem in that the sensitivity of the inductive sensing varies depending on the distance from the touch sensing unit that is directly touched.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a touch sensing device is applicable to an electronic device including a touch manipulation unit disposed on a housing. The touch manipulation unit includes a first touch sensing member and a second touch sensing member, for capacitive sensing, and a force sensing member for inductive sensing. The touch sensing device includes: a first touch sensor device disposed on an internal surface of the first touch sensing member; a second touch sensor device disposed on an internal surface of the second touch sensing member; a force sensor device spaced apart from an internal surface of the force sensing member; an oscillation circuit configured to generate a first oscillation signal, based on a change in capacitance in response to the first touch sensing member being touched, generate a second oscillation signal, based on a change in capacitance in response to the second touch sensing member being touched, and generate a third oscillation signal, based on a change in inductance depending on a change in spacing between the force sensing member and the force sensor device; and a touch detection circuit configured to adjust a threshold for force sensing through the force sensor device depending on positions of the first and second touch sensing members, based on the first and second oscillation signals.

The touch detection circuit may be further configured to detect a touch through the first touch sensing member or a touch through the second touch sensing member when the force sensing through the force sensor device is performed, based on the first, second, and third oscillation signals.

The touch detection circuit may be further configured to: generate first, second, and third comparison signals corresponding to the first, second, and third oscillation signals, respectively; adjust a detection level of the third comparison signal by changing a detection threshold of the third comparison signal, based on the first and second comparison signals; generate a first detection signal, based on the first and third comparison signals; and generate a second detection signal, based on the second and third comparison signals.

The touch detection circuit may be further configured to: count the first, second, and third oscillation signals to convert the first, second, and third oscillation signals into first, second, and third count values, respectively; compare the first, second, and third count values with first, second, and third thresholds, respectively, to generate the first, second, and third comparison signals; vary the third threshold, based on the first and second comparison signals; generate the first detection signal by detecting a touch of the first touch sensing member based on the first and third comparison signals; and generate the second detection signal by detecting a touch of the second touch sensing member based on the second and third comparison signals.

The oscillation circuit may include: a first oscillation circuit connected to the first touch sensor device and configured to generate the first oscillation signal based on the change in capacitance in response to the first touch sensing member being touched; a second oscillation circuit connected to the second touch sensor device and configured to generate the second oscillation signal based on the change in capacitance in response to the second touch sensing member being touched; and a third oscillation circuit connected to the force sensor device and configured to generate the third oscillation signal based on the change in inductance depending on the change in spacing between the force sensing member and the force sensor device.

The touch detection circuit may include: a converter circuit configured to count the first, second, and third oscillation signals to convert the first, second, and third oscillation signals into first, second, and third count values, respectively; and a detection circuit configured to compare the first, second, and third count values with first, second, and third thresholds, respectively, to generate first, second and third comparison signals, vary the third threshold, based on the first and second comparison signals, generate the first detection signal by detecting a touch of the first touch sensing member based on the first and third comparison signals, and generate the second detection signal by detecting a touch of the second touch sensing member based on the second and third comparison signals.

The converter circuit may include: a first converter configured to count a reference clock signal using the first oscillation signal to generate the first count value; a second converter configured to count the reference clock signal using the second oscillation signal to generate the second count value; and a third converter configured to count the reference clock signal using the third oscillation signal to generate the third count value.

The detection circuit may include: a first detector configured to compare the first count value with the first threshold to generate the first comparison signal; a second detector configured to compare the second count value with a second threshold to generate the second comparison signal; a third detector configured to compare the third count value with the third threshold to generate the third comparison signal; and a variable threshold circuit configured to vary the third threshold based on the first and second comparison signals. The first detector may be further configured to generate the first detection signal by detecting the touch of the first touch sensing member based on the first and third comparison signals. The second detector may be further configured to generate the second detection signal by detecting the touch of the second touch sensing member based on the second and third comparison signals.

The third detector may include a comparator configured to generate the third comparison signal to have a high level, in response to the third count value being higher than the third threshold, by comparing the third count value with the third threshold.

The variable threshold circuit may be configured to vary the third threshold based on a distance between the force sensing member and the first touch sensing member or a distance between the force sensing member and the second touch sensing member, based on the first or second comparison signal.

The touch detection circuit may be further configured to adjust the threshold for force sensing through the force sensor device depending on a distance between the force sensing member and the first touch sensing member or a distance between the force sensing member and the second touch sensing member, based on the first oscillation signal or the second oscillation signal.

In another general aspect, an electronic device includes: a housing; a touch manipulation unit disposed on the housing and including a first touch sensing member configured for capacitive sensing, a second touch sensing member configured for capacitive sensing, and a force sensing member configured for inductive sensing; a first touch sensor device disposed on an internal surface of the first touch sensing member; a second touch sensor device disposed on an internal surface of the second touch sensing member; a force sensor device spaced apart from an internal surface of the force sensing member; an oscillation circuit configured to generate a first oscillation signal, based on a change in capacitance in response to the first touch sensing member being touched, generate a second oscillation signal, based on a change in capacitance in response to the second touch sensing member being touched, and generate a third oscillation signal, based on a change in inductance depending on a change in spacing between the force sensing member and the force sensor device; and a touch detection circuit configured to adjust a threshold for force sensing through the force sensor device depending on positions of the first and second touch sensing members, based on the first and second oscillation signals.

The touch detection circuit may be further configured to detect a touch through the first touch sensing member or a touch through the second touch sensing member when the force sensing through the force sensor device is performed, based on the first, second, and third oscillation signals.

The touch detection circuit may be further configured to: generate first, second, and third comparison signals corresponding to the first, second, and third oscillation signals, respectively; adjust a detection level of the third comparison signal by changing a detection threshold of the third comparison signal, based on the first and second comparison signals; generate a first detection signal, based on the first and third comparison signals; and generate a second detection signal, based on the second and third comparison signals.

The touch detection circuit may be further configured to: count the first, second, and third oscillation signals to convert the first, second, and third oscillation signals into first, second, and third count values, respectively; compare the first, second, and third count values with first, second and third thresholds, respectively, to generate the first, second, and third comparison signals; vary the third threshold, based on the first and second comparison signals; generate the first detection signal by detecting a touch of the first touch sensing member based on the first and third comparison signals; and generate the second detection signal by detecting a touch of the second touch sensing member based on the second and third comparison signals.

The oscillation circuit may include: a first oscillation circuit connected to the first touch sensor device and configured to generate the first oscillation signal based on the change in capacitance in response to the first touch sensing member being touched; a second oscillation circuit connected to the second touch sensor device and configured to generate the second oscillation signal based on the change in capacitance in response to the second touch sensing member being touched; and a third oscillation circuit connected to the force sensor device and configured to generate the third oscillation signal based on the change in inductance depending on the change in spacing between the force sensing member and the force sensor device.

The force sensing member may be disposed between the first touch sensing member and the second touch sensing member.

The second touch sensing member may be disposed between the first touch sensing member and the force sensing member.

The touch detection circuit may include: a converter circuit configured to count the first, second, and third oscillation signals to convert the first, second, and third oscillation signals into first, second and third count values, respectively; and a detection circuit configured to compare the first, second, and third count values with first, second, and third thresholds, respectively, to generate first, second and third comparison signals, vary the third threshold, based on the first and second comparison signals, generate a first detection signal by detecting a touch of the first touch sensing member based on the first and third comparison signals, and generate a second detection signal by detecting a touch of the second touch sensing member based on the second and third comparison signals.

The converter circuit may include: a first converter configured to count a reference clock signal using the first oscillation signal to generate the first count value; a second converter configured to count the reference clock signal using the second oscillation signal to generate the second count value; and a third converter configured to count the reference clock signal using the third oscillation signal to generate the third count value.

The detection circuit may include: a first detector configured to compare the first count value with the first threshold to generate the first comparison signal; a second detector configured to compare the second count value with the second threshold to generate the second comparison signal; a third detector configured to compare the third count value with the third threshold to generate the third comparison signal; and a variable threshold circuit configured to vary the third threshold based on the first and second comparison signals. The first detector may be further configured to generate the first detection signal by detecting the touch of the first touch sensing member based on the first and third comparison signals. The second detector may be further configured to generate the second detection signal by detecting the touch of the second touch sensing member based on the second and third comparison signals.

The third detector may include a comparator configured to generate the third comparison signal to have a high level, in response to the third count value being higher than the third threshold, by comparing the third count value with the third threshold.

The variable threshold circuit may be further configured to vary the third threshold based on a distance between the force sensing member and the first touch sensing member or a distance between the force sensing member and the second touch sensing member, based on the first or second comparison signal.

The touch detection circuit may be further configured to adjust the threshold for force sensing through the force sensor device depending on a distance between the force sensing member and the first touch sensing member or a distance between the force sensing member and the second touch sensing member, based on the first oscillation signal or the second oscillation signal.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
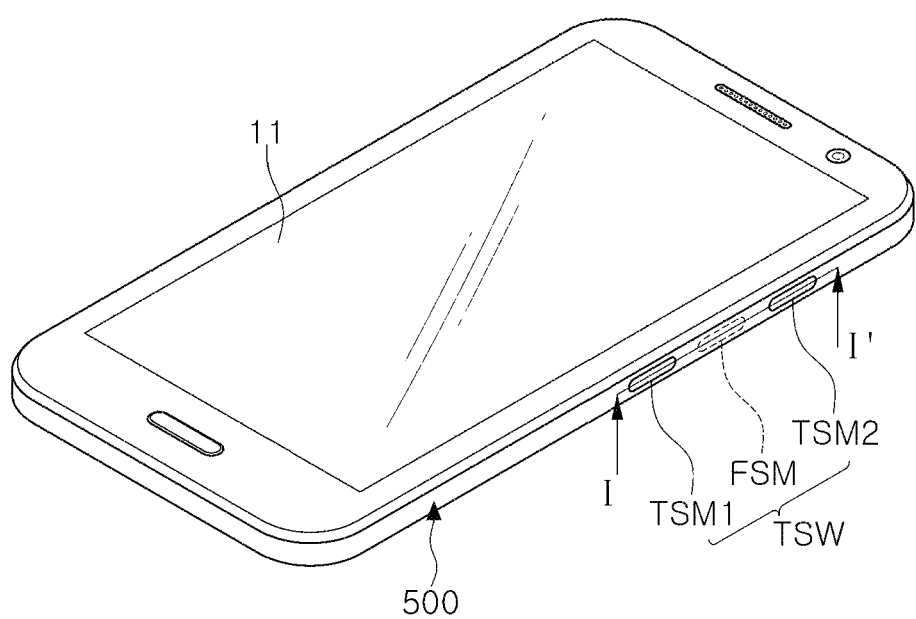
FIG. 1 is an external perspective view of an electronic device, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," "front," "rear," and "side" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. For another example, if the device in the figures is turned around, an element described as being "front" relative to another element will then be "rear" relative to the other element. Thus, the term "front" encompasses both the front and rear orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is an external perspective view of an electronic device 10, according to an example.

Referring to FIG. 1, the electronic device 10 may include, for example, a touch screen 11, a housing 500, and a touch manipulation unit TSW.

The touch manipulation unit TSW may include a first touch sensing member TSM1 and a second touch sensing member TSM2 for capacitive sensing. The first and second touch sensing members TSM1 and TSM2 are disposed on the housing 500. The touch manipulation unit TSW may further include a force sensing member FSM for inductive sensing, which replaces a mechanical button switch. In this example, each of the first touch sensing member TSM1 and the second touch sensing member TSM2 is a member that is configured to be directly touched, and the force sensing member FSM is configured to not be directly touched and is engaged with the touch when at least one of the first touch sensing member TSM and the second touch sensing member TSM2 is touched, to generate warp inside the housing 500.

Although FIG. 1 illustrates an example in which the touch manipulation unit TSW includes the first and second touch sensing members TSM1 and TSM2 and the force sensing member FSM for convenience of description, the disclosure is not limited to this example.

In this disclosure, the housing 500 may be a conductor constructed of a material such as a metal. For example, when the housing 500 is a conductor and touch areas for a touch inputs are disposed in a plurality of different positions, it may not be easy to identify each position of the touch areas. However, in examples disclosed herein, the force sensing member may be provided, and thus, the touch areas (or touch positions) may be more accurately identified through touch and force detection.

For example, referring to FIG. 1, the electronic device 10 may be a portable device, such as a smartphone, a wearable device, such as a smartwatch, or the like, but is not limited to a specific device. The electronic device 10 may be a portable or wearable electronic device, or may be an electronic device having a switch for controlling motion.

The housing 500 may be an external case exposed externally of the electronic device. For example, when the electronic device 10 is embodied by a touch sensing device applied to a mobile device, the housing 500 may be a cover disposed on a side of the mobile device 10. For example, the housing 500 may be integrally formed with a cover disposed on a rear surface of the mobile device 10, or may be formed separately from a cover disposed on the rear surface of the mobile device 10.

As described above, the housing 500 may be an external case of the electronic device 10, and is not particularly limited to a specific location, shape, or structure.

Referring to FIG. 1, each of the first and second touch sensing members TSM1 and TSM2 and the force sensing member FSM may be disposed in the housing 500 of the electronic device 10.

The first and second touch sensing members TSM1 and TSM2 and the force sensing member FSM may be disposed on the cover of the electronic device 10. In this case, the cover may be a cover excluding the touch screen, for example, a side cover, a rear cover, or a cover that may be formed on a portion of the front surface. For convenience of description, an example in which the housing 500 is a side cover of the electronic device 10 will be described. However, the disclosure is not limited to this example.

Figure 2:
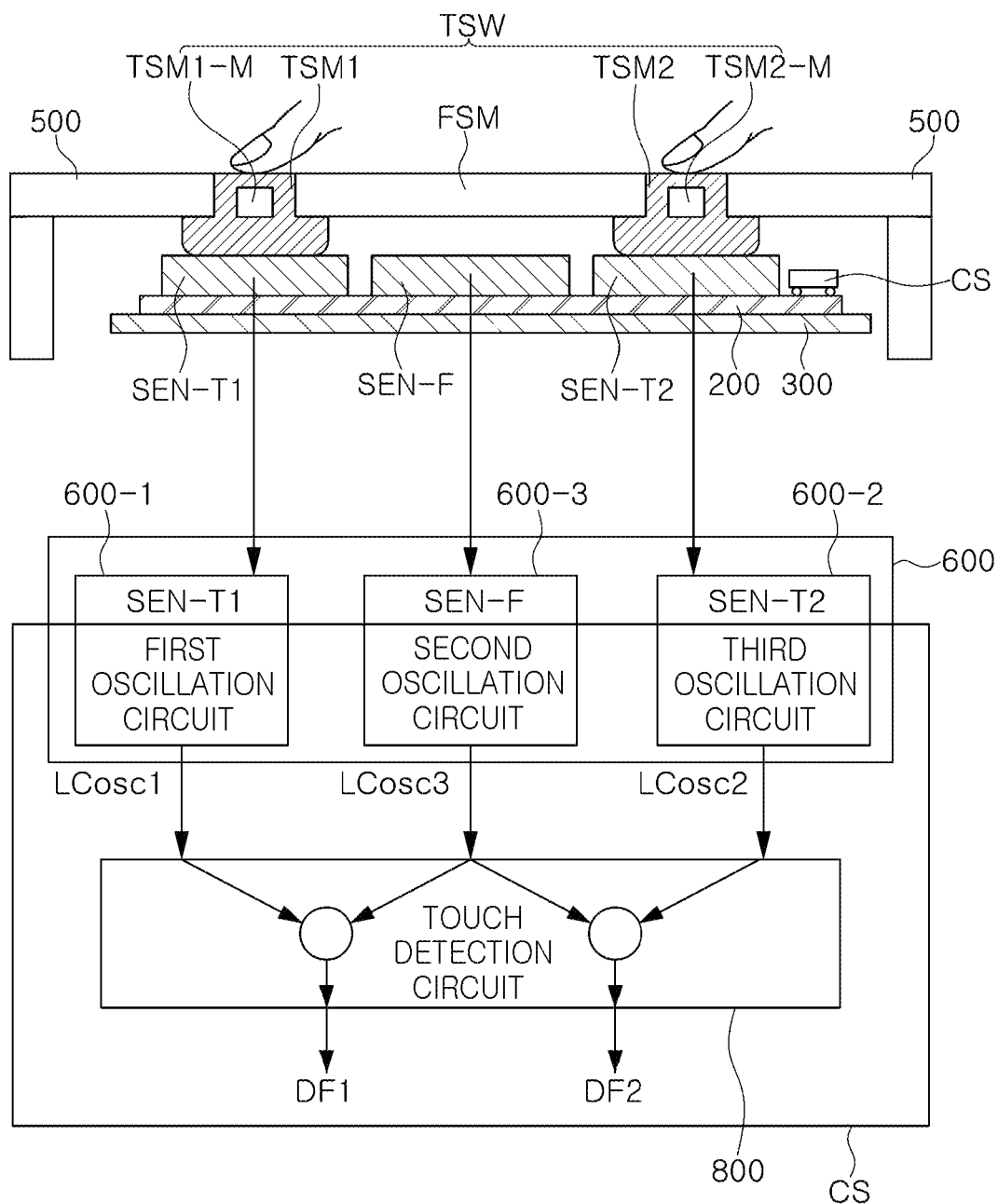
FIG. 2 is a configuration diagram of the electronic device illustrating a cross-section taken along line I-I' in FIG. 1, according to an example.
Figure 3:
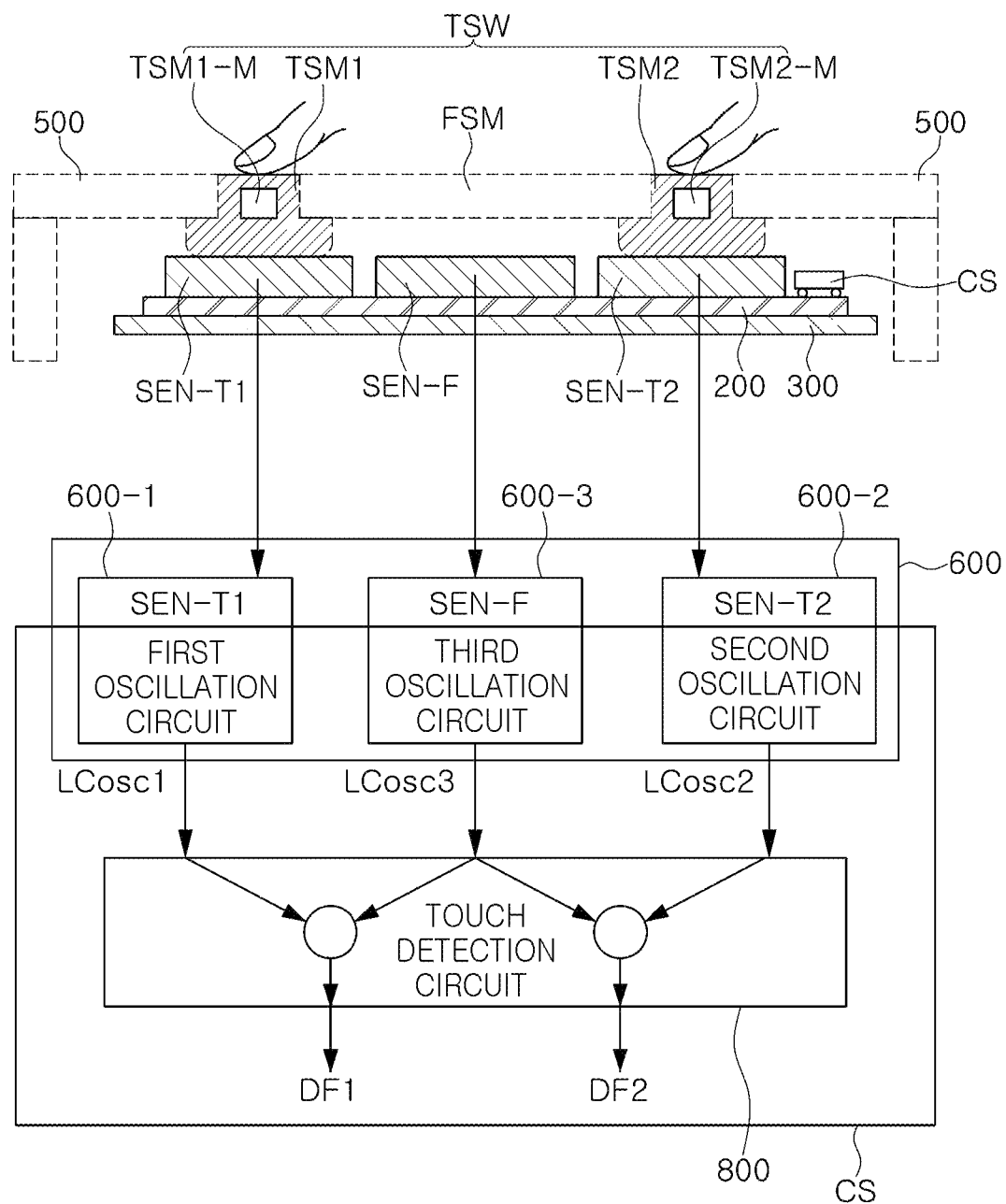
FIG. 3 is a configuration diagram of a touch sensing device illustrating a cross-section taken along line I-I' of FIG. 1, according to an example.

FIG. 2 is a configuration diagram of the electronic device 10 illustrating an I-I' line cross-section of FIG. 1, according to an example. FIG. 3 is a configuration diagram of a touch sensing device illustrating a cross-section taken along line I-I' of FIG. 1, according to an example.

Referring to FIG. 2, the electronic device 10 may include the housing 500, the touch manipulation unit TSW including the first touch sensing member TSM1, the second touch sensing member TSM2 and the force sensing member FSM, a first touch sensor unit or first touch sensor device SEN-T1, a second touch sensor unit or second touch sensor device SEN-T2, a force sensor unit or force sensor device SEN-F, an oscillation circuit 600, and a touch detection circuit 800.

Referring to FIG. 3, the touch sensing device may include the first touch sensor unit SEN-T1, the second touch sensor unit SEN-T2, the force sensor unit SEN-F, the oscillation circuit 600, and the touch detection circuit 800.

The housing 500, as described above, may be an external case of the electronic device 10, and for example, may be a side case. For example, the housing 500 may be a conductor.

The touch manipulation unit TSW is disposed on the housing 500 and includes the first touch sensing member TSM1 and the second touch sensing member TSM2 configured for capacitive sensing, and the force sensing member FSM configured for inductive sensing.

For example, the first touch sensing member TSM1 and the second touch sensing member TSM2 may each be formed of an insulating member disposed in a space penetrating through a portion of the housing 100. The first touch sensing member TSM1 and the second touch sensing member TSM2 may further include conductor members TSM1-M and TSM2-M disposed in the insulating members, respectively, and the conductor members TSM1-M and TSM2-M) may or may not be partially exposed externally.

The first touch sensor unit SEN-T1 may be disposed on an internal surface of the first touch sensing member TSM1. The second touch sensor unit SEN-T2 may be disposed on an internal surface of the second touch sensing member TSM2. The force sensor unit SEN-F may be disposed to be spaced apart from the internal surface of the force sensing member FSM. In an example, the first touch sensor unit SEN-T1, the second touch sensor unit SEN-T2, and the force sensor unit SEN-F may each be a coil element or a coil component, and for example, may be a printed circuit board (PCB) coil.

For example, the first touch sensor unit SEN-T1 may be disposed to be out of contact with the housing 500 by the insulating member of the first touch sensing member TSM1, and the second touch sensing unit SEN-T2 may be disposed to be out of contact with the housing 500 by the insulating member of the second touch sensing member TSM2. That is, the insulating member of the first touch sensing member TSM1 may be disposed between the first touch sensor unit SEN-T1 and the housing 500, and the insulating member of the second touch sensing member TSM2 may be disposed between the second touch sensor unit SEN-T2 and the housing 500.

In addition, the first touch sensor unit SEN-T1, the second touch sensor unit SEN-T2, and the force sensor unit SEN-F may be mounted on a substrate 200, and the substrate 200 may be attached to a support member 300. The support member 300 may be supported on an internal structure of the electronic device 10. A circuit unit CS may be mounted on the substrate 200, and the circuit unit CS may include a circuit part of the oscillation circuit 600 and the touch detection circuit 800.

The oscillation circuit 600 may generate a first oscillation signal LCosc1 based on a change in capacitance that occurs in response to the first touch sensing member TSM1 being touched, generate a second oscillation signal LSosc2 based on a change in capacitance that occurs in response to the second touch sensing member TSM2 being touched, and generate a third oscillation signal LCosc3 based on a change in inductance depending on a change in a distance between the force sensing member FSM and the force sensor unit SEN-F.

Based on the first, second, and third oscillation signals, the touch detection circuit 800 adjusts a threshold for sensing of force through the force sensor unit FSM depending on the positions of the first and second touch sensing members TSM1 and TSM2. When the force is sensed through the force sensor unit FSM, a touch through the first touch sensing member TSM1 or a touch through the second touch sensing member TSM2 may be detected. In this case, when the threshold (corresponding to a third threshold described below) for force sensing through the force sensor unit FSM is adjusted, the force sensing sensitivity through the force sensor unit FSM may be varied.

For example, the touch detection circuit 800 may generate first, second, and third comparison signals SD1, SD2, and SD3 corresponding to the first, second, and third oscillation signals LCosc1, LCosc2 and LCosc3, may change a detection threshold of the third comparison signal SD3 based on the first and second comparison signals SD1 and SD3, may generate a first detection signal DF1 based on the first and third comparison signals SD1 and SD3, and may generate a second detection signal DF2 based on the second and third comparison signals SD2 and SD3. As described above, the force sensing sensitivity may be adjusted by adjusting the detection threshold of the third comparison signal SD3.

Referring to FIGS. 2 and 3, the oscillation circuit 600 may include a first oscillation circuit 600-1, a second oscillation circuit 600-2, and a third oscillation circuit 600-3.

The first oscillation circuit 600-1 is connected to the first touch sensor unit SEN-T1, and may generate the first oscillation signal LCosc1 based on a change in capacitance when the first touch sensing member TSM1 is touched.

The second oscillation circuit 600-2 may be connected to the second sensor unit SEN1 and may generate the second oscillation signal LCosc2 based on a change in capacitance when the second touch sensing member TSM2 is touched.

The third oscillation circuit 600-3 may be connected to the force sensor unit SEN-F, and may generate the third oscillation signal LCosc3 based on a change in inductance depending on a change in a distance between the force sensing member FSM and the force sensor unit SEN-F.

The touch detection circuit 800 may count the first, second, and third oscillation signals LCosc1, LCosc2, and LCosc3, to convert the first, second, and third oscillation signals LCosc1, LCosc2, and LCosc3 into first, second, and third count values CV1, CV2, and CV3, respectively. The touch detection circuit 800 may compare the first, second, and third count values CV1, CV2, and CV3 with first, second, and third thresholds TH1, TH2, and TH3, respectively, to generate the first, second and third comparison signals SD1, SD2, and SD3, varies the third threshold TH3 based on the first and second comparison signals SD1 and SD2. The touch detection circuit 800 generates a first detection signal DF1 by detecting a touch of the first touch sensing member TSM1 based on the first and third comparison signals SD1 and SD3, and generates a second detection signal DF2 by detecting a touch of the second touch sensing member TSM2 based on the second and third comparison signals SD2 and SD3.

For respective drawings of the present disclosure, unnecessary duplicate descriptions may be omitted for the same reference numerals and components having the same function, and possible differences for respective drawings may be described.

Figure 4:
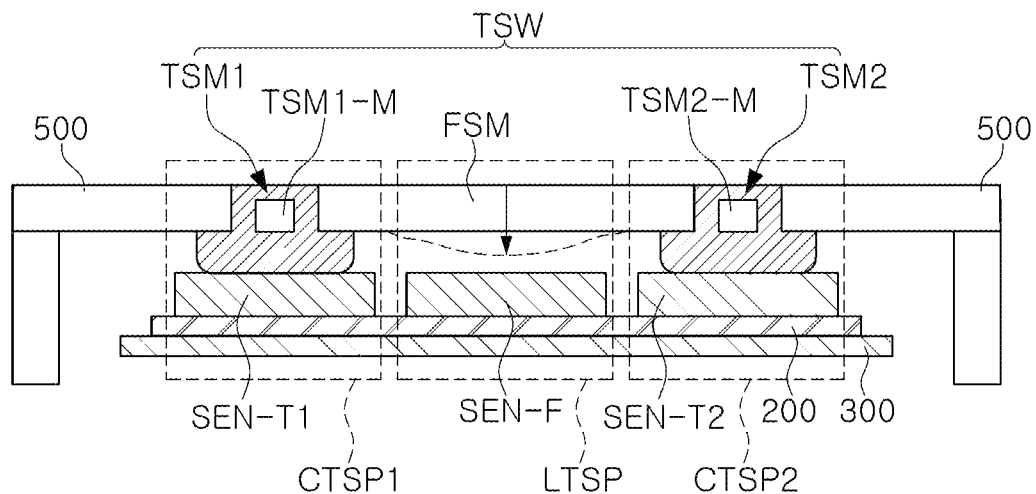
FIG. 4 is a view of an arrangement of touch sensing members and a force sensing member of a touch manipulation unit, according to an example.
Figure 5:
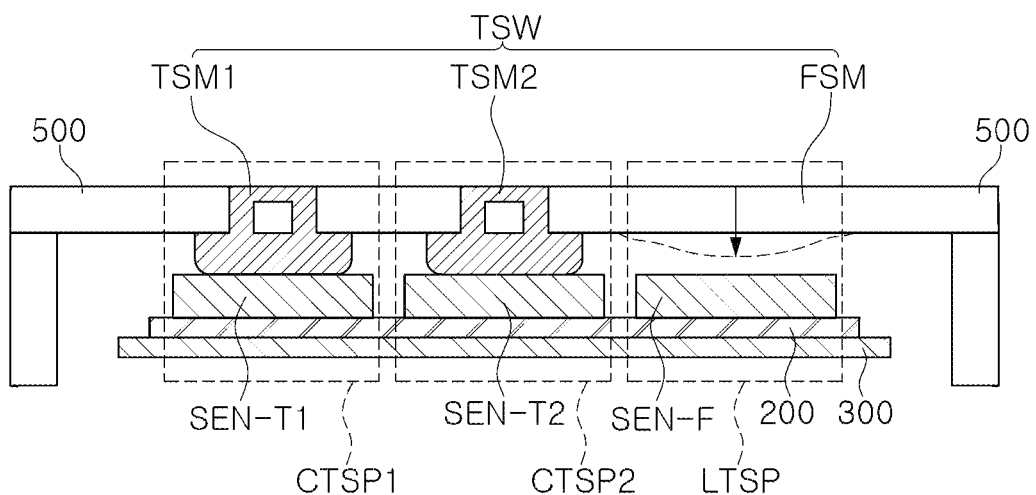
FIG. 5 is a view illustrating an arrangement of the touch sensing members and the force sensing member of the touch manipulation unit.
Figure 6:
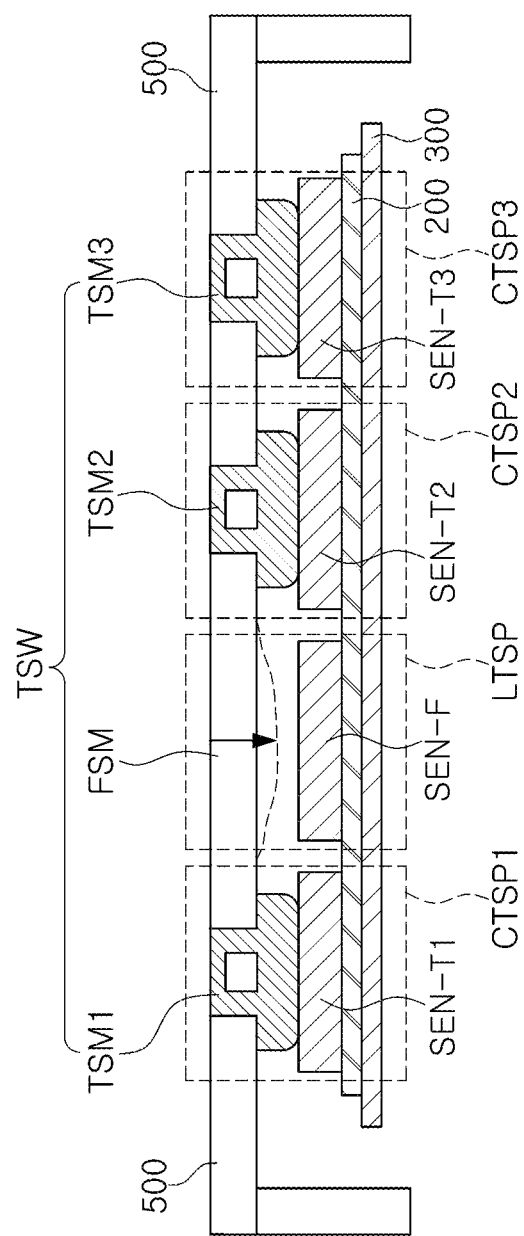
FIG. 6 a view illustrating an arrangement of the touch sensing members and the force sensing member of the touch manipulation unit, according to an example.

FIG. 4 is a view of arrangement of the first and second touch sensing members TSM1 and TSM2 and the force sensing member FSM of the touch manipulation unit, TSW, according to an example. FIG. 5 is a view of arrangement of the first and second touch sensing members TSM1 and TSM2 and the force sensing member FSM of the touch manipulation unit TSW, according to an example. FIG. 6 is a view of arrangement of the first and second touch sensing members TSM1 and TSM2 and the force sensing member FSM of the touch manipulation unit TSW, according to an example.

Referring to FIGS. 4 and 6, the force sensing member FSM may be disposed between the first touch sensing member TSM1 and the second touch sensing member TSM2.

The electronic device 10 may include a first capacitive sensing unit CTSP1 including the first touch sensing member TSM1 and the first touch sensor unit SEN-T1, a second capacitive sensing unit CTSP2 including the second touch sensing member TSM2 and the second touch sensor unit SEN-T2, and an inductive sensing unit LTSP including the force sensing member FSM and the force sensor unit SEN-F.

In this example, the inductive sensing unit LTSP may be disposed between the first capacitive sensing unit CTSP1 and the second capacitive sensing unit CTSP2.

Referring to FIG. 5, the second touch sensing member TSM2 may be disposed between the first touch sensing member TSM1 and the force sensing member FSM. In this example, the second capacitive sensing unit CTSP2 may be disposed between the first capacitive sensing unit CTSP1 and the inductive sensing unit LTSP.

Referring to FIG. 6, the electronic device 10 may further include a third capacitive sensing unit CTSP3 including a third touch sensing member TSM3 and a third touch sensor unit SEN-T3.

As described above, the electronic device 10 is not limited to the illustration of FIGS. 4 and 5, and may include a plurality of capacitive sensing units and inductive sensing units in various arrangement structures, as in the example illustrated in FIG. 6.

Figure 7:
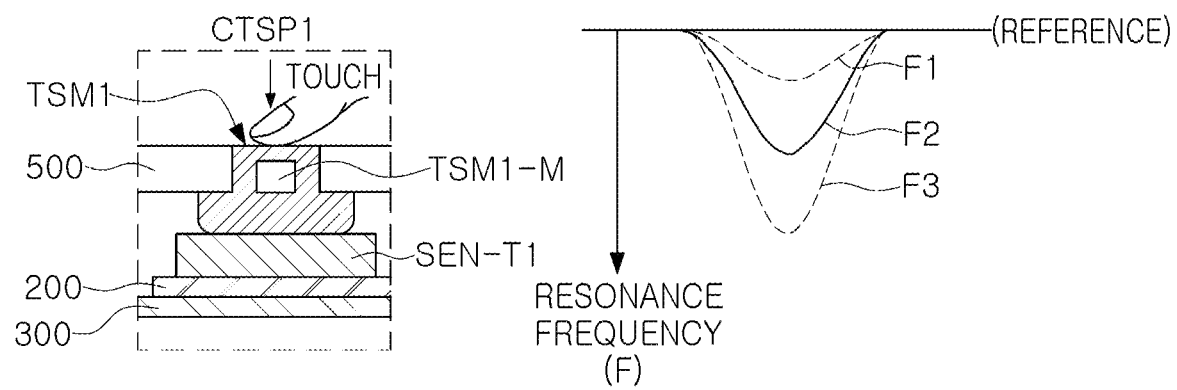
FIG. 7 is an explanatory diagram of a capacitive sensing unit and sensing sensitivity, according to an example.

FIG. 7 is an explanatory diagram of the capacitive sensing unit CTSP1 and a sensing sensitivity.

The first capacitive sensing unit CTSP1 illustrated in FIGS. 5 and 7 illustrates that frequency magnitudes F1, F2, and F3 are changed depending on sensing sensitivity as illustrated on the right side of FIG. 7.

For example, when the sensing sensitivity of the first capacitive sensing unit CTSP1 becomes small, medium, and large, the frequency magnitudes may also be lower than the standard, and change as illustrated as F1, F2, and F3.

Figure 8:
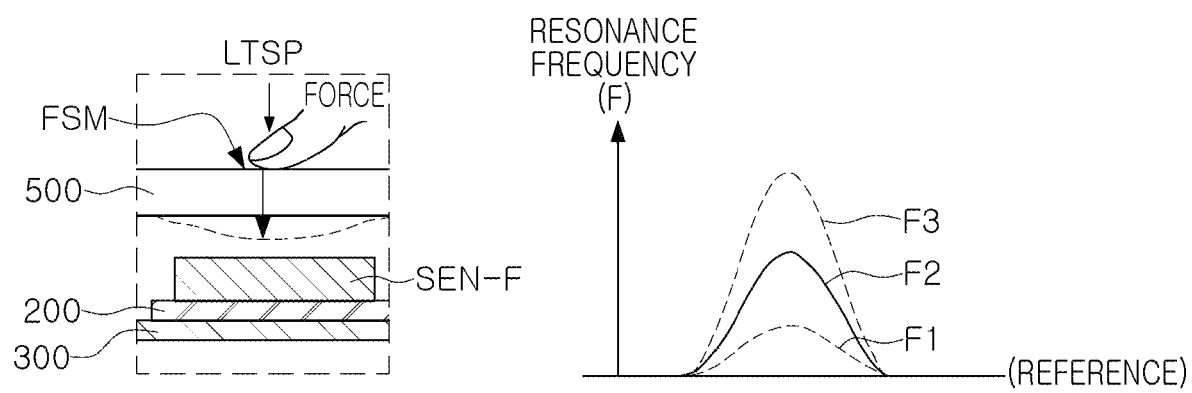
FIG. 8 is an explanatory diagram of an inductive sensing unit and sensing sensitivity, according to an example.

FIG. 8 is an explanatory diagram of the inductive sensing unit LTSP and sensing sensitivity, according to an example.

The inductive sensing unit LTSP illustrated in FIGS. 6 and 8 illustrates that the frequency magnitudes F1, F2, and F3 are changed depending on the sensing sensitivity as illustrated on the right side of FIG. 8.

For example, when the sensing sensitivity of the inductive sensing unit LTSP becomes small, medium, and large, it can be seen that the frequency magnitudes are also higher than the standard, and change as illustrated as F1, F2, and F3.

In addition, the illustration of FIGS. 7 and 8 may be applied to a hybrid structure in which a capacitive scheme and an inductive scheme are mixed.

Referring to FIG. 7, in a capacitive scheme, when a human hand or finger touches a corresponding touch sensing member TSM1 that is a target touch surface, an impedance change (capacitance) may be detected as a frequency change of the corresponding oscillation circuit. The oscillation circuit has a different frequency variation depending on the touch sensitivity. In the structure of the capacitive scheme as illustrated in FIG. 7, a touch is recognized only when the amount of frequency change exceeds a threshold.

Referring to FIG. 8, in the inductive scheme, pressure is applied to a corresponding force sensing member FSM, which is a touch surface, thereby changing a gap between the touch surface and the internal force sensor unit SEN-F. Thus, an impedance change (inductance) of the force sensor unit SEN-F may be detected using a frequency change of the corresponding oscillation circuit. In this example, in the inductive scheme, the amount of frequency change is also changed depending on the pressing force, as in the capacitive scheme, and in the structure of the inductive scheme illustrated in FIG. 8, force is recognized as a touch only when the amount of frequency change exceeds a threshold.

Figure 9:
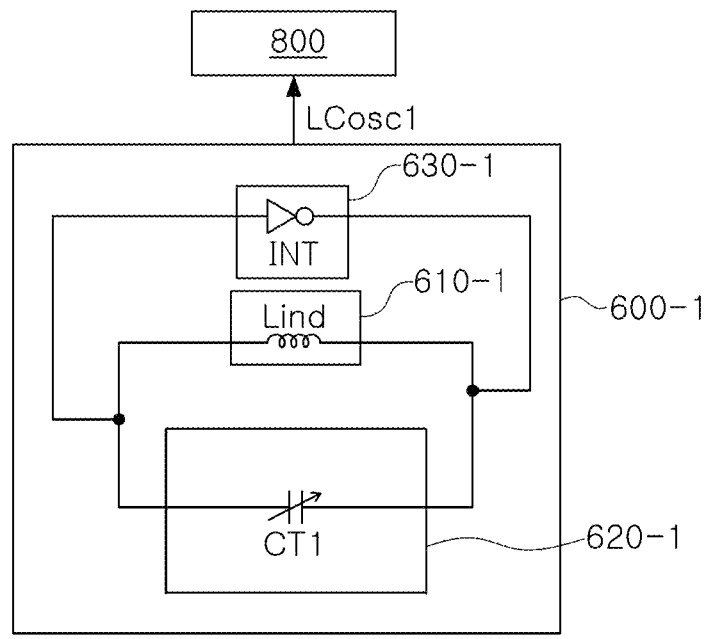
FIG. 9 is a view of a first oscillation circuit, according to an example.
Figure 10:
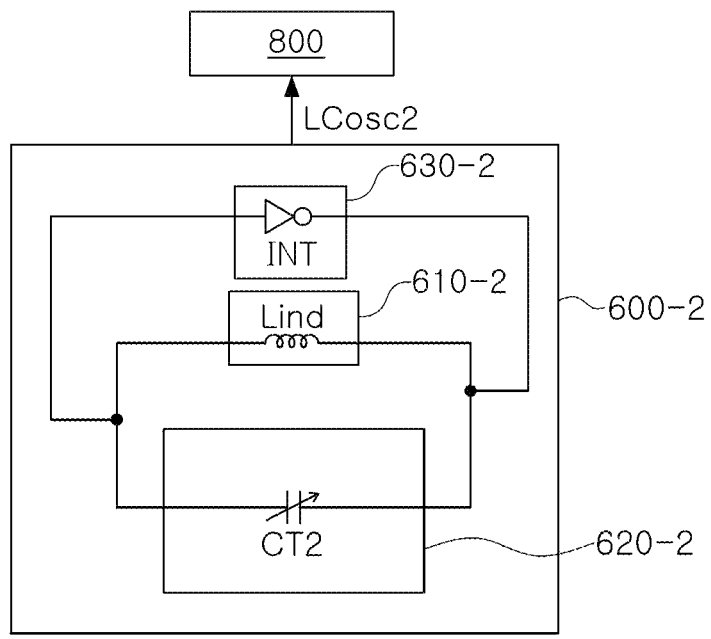
FIG. 10 is a view of a second oscillation circuit, according to an example.
Figure 11:
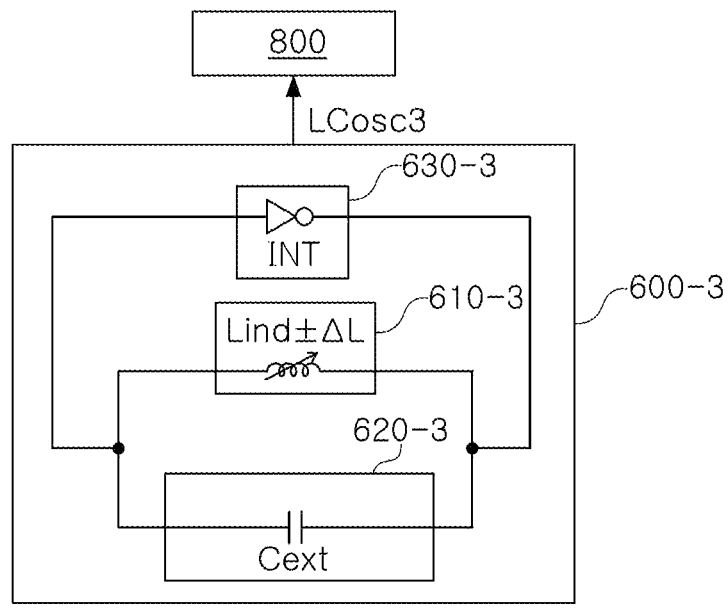
FIG. 11 is a view of a third oscillation circuit, according to an example.

FIG. 9 is a view of the first oscillation circuit 600-1, according to an example. FIG. 10 is a view of the second oscillation circuit 600-2, according to an example. FIG. 11 is a view of the third oscillation circuit 600-3, according to an example.

Referring to FIG. 9, the first oscillation circuit 600-1 may include, for example, a first inductance circuit 610-1, a first capacitance circuit 620-1, and a first amplification circuit 630-1.

The first inductance circuit 610-1 may include an inductance for resonance by including a first touch sensor unit SEN-T1 mounted on the substrate 200 and having an inductance Lind. For example, the first touch sensor unit SEN-T1 may include a first inductor element having an inductance. For example, the first inductor element may be a PCB coil.

The first capacitance circuit 620-1 may include capacitance for resonance by including a first capacitor element mounted on the substrate 200 and having capacitance.

The first amplification circuit 630-1 is connected to the first inductance circuit 610-1 and the first capacitance circuit 620-1, to generate the first oscillation signal LCosc1 having a resonance frequency determined by the first inductance circuit 610-1 and the first capacitance circuit 620-1.

In this example, the first capacitance circuit 620-1 may provide a first touch capacitance CT that is varied when the first touch sensing member TSM1 is touched.

Referring to FIG. 10, the second oscillation circuit 600-2 may include, for example, a second inductance circuit 610-2, a second capacitance circuit 620-2, and a second amplification circuit 630-2.

The second inductance circuit 610-2 may include an inductance for resonance by including the second touch sensor unit SEN-T2 mounted on the substrate 200 and having an inductance Lind. For example, the second touch sensor unit SEN-T2 may include a second inductor element having inductance. For example, the second inductor element may be a PCB coil.

The second capacitance circuit 620-2 may include a second capacitor element mounted on the substrate 200 and having capacitance to include capacitance for resonance.

The second amplification circuit 630-2 is connected to the second inductance circuit 610-2 and the second capacitance circuit 620-2, to generate the second oscillation signal LCosc2 having a resonance frequency determined by the second inductance circuit 610-2 and the second capacitance circuit 620-2.

In this example, the second capacitance circuit 620-2 may provide a second touch capacitance CT2 that is varied when the second touch sensing member TSM2 is touched.

Referring to FIG. 11, the third oscillation circuit 600-3 may include, for example, a third inductance circuit 610-3, a third capacitance circuit 620-3, and a third amplification circuit 630-3.

The third inductance circuit 610-3 may include the force sensor unit SEN-F having an inductance Lind and mounted on the substrate 200 to include inductance for resonance. For example, the force sensor unit SEN-F may include a third inductor element having inductance. For example, the third inductor element may be a PCB coil.

The third capacitance circuit 620-3 may include a third capacitor element mounted on the substrate 200 and having capacitance, to include a capacitance Cext for resonance.

The third amplification circuit 630-3 is connected to the third inductance circuit 610-3 and the third capacitance circuit 620-3, to generate the third oscillation signal LCosc3 having a resonance frequency determined by the third inductance circuit 610-3 and the third capacitance circuit 620-3.

In this example, the third inductance circuit 610-3 may provide a force inductance (Lind±ΔL) that varies depending on a change in the distance between the force sensing member FSM and the force sensor unit SEN-F.

Figure 12:
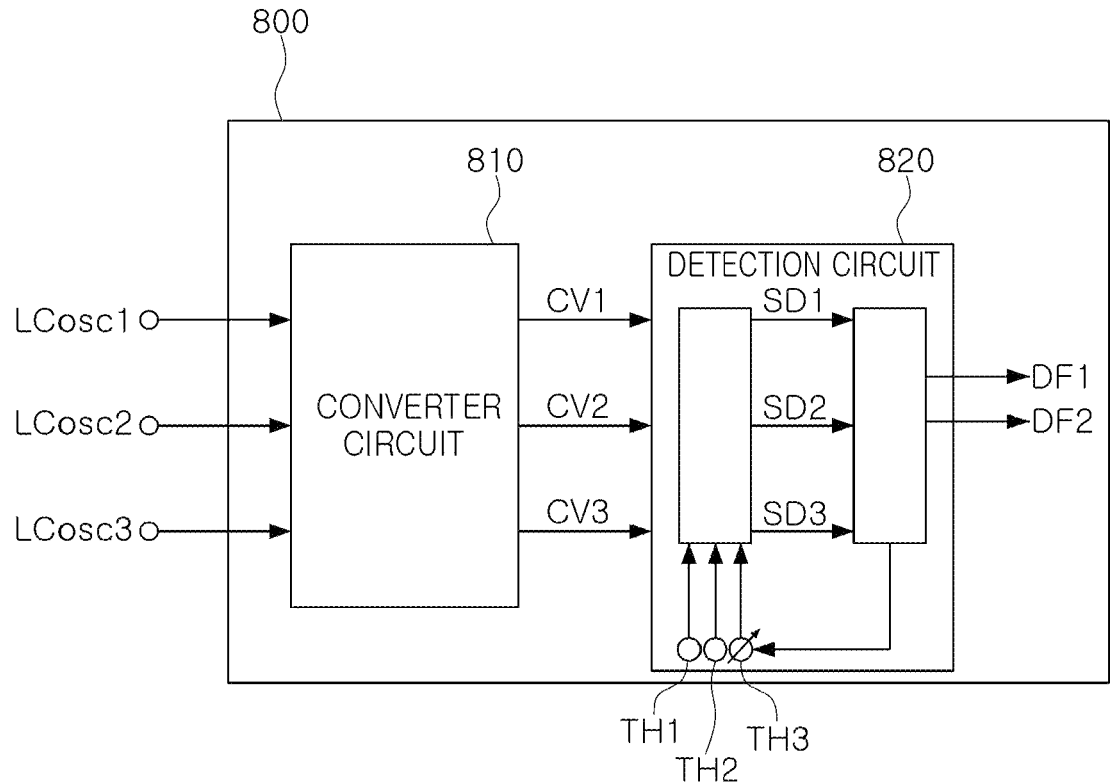
FIG. 12 is a diagram of a touch detection circuit, according to an example.

FIG. 12 is a diagram of a touch detection circuit, according to an example.

Referring to FIG. 12, the touch detection circuit 800 may include a converter circuit 810 and a detection circuit 820.

The converter circuit 810 may count the first, second and third oscillation signals LCosc1, LCosc2 and LCosc3 to convert the first, second, and third oscillation signals LCosc1, LCosc2 and LCosc3 into first, second, and third count values CV1, CV2 and CV3, respectively.

The detection circuit 820 may compare the first, second and third count values CV1,CV2, and CV3 with the first, second, and third thresholds TH1,TH2, and TH3, respectively, to generate the first, second, and third comparison signals SD1, SD2, and SD3. The detection circuit 820 may vary the third threshold TH3 based on the first and second comparison signals SD1 and SD2, generate the first detection signal DF1 by detecting the touch of the first touch sensing member TSM1 based on the first and third comparison signals SD1 and SD3, and generate the second detection signal DF2 by detecting the touch of the second touch sensing member TSM2 based on the second and third comparison signals SD2 and SD3.

As such, the third threshold TH3 may be varied based on the first and second comparison signals SD1 and SD2, and thus, force sensing sensitivity may be adjusted.

Figure 13:
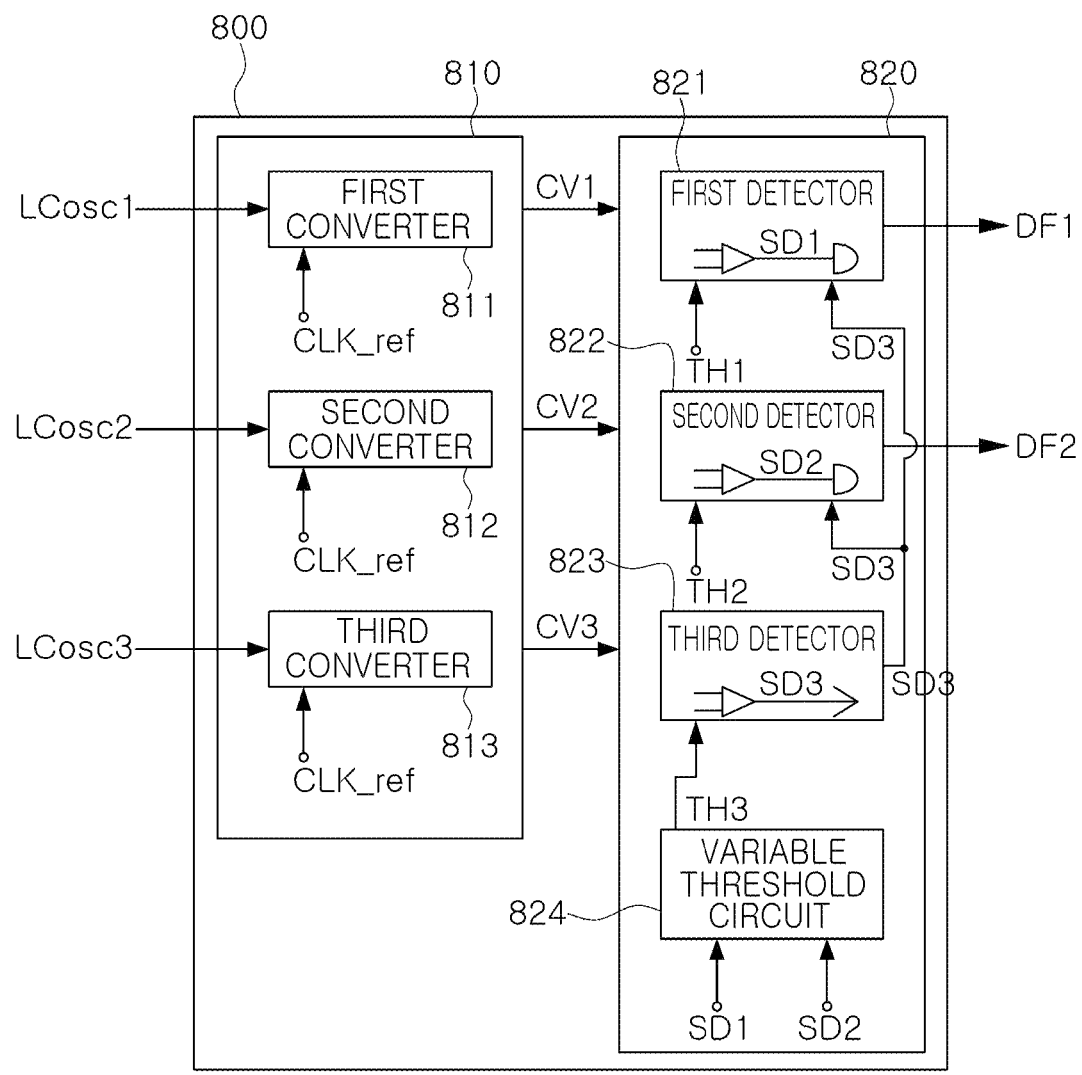
FIG. 13 is a detailed illustration of a touch detection circuit, according to an example.

FIG. 13 is a detailed illustration of the touch detection circuit, according to an example.

Referring to FIG. 13, the converter circuit 810 may include, for example, a first converter 811, a second converter 812, and a third converter 813.

The first converter 811 may count a reference clock signal CLK_ref using the first oscillation signal LCosc1 to generate the first count value CV1. The second converter 812 may generate the second count value CV2 by counting the reference clock signal CLK_ref using the second oscillation signal LCosc2. The third converter 813 may generate the third count value CV3 by counting the reference clock signal CLK_ref using the third oscillation signal LCosc3.

In this example, when the reference clock signal CLK_ref is counted using the oscillation signal LCosc1, LCosc2, or LCosc3, the frequency of the reference clock signal CLK_ref may be lower than the frequency of the oscillation signal LCosc1, LCosc2, or LCosc3, so that the implementation of a reference clock signal generator may be facilitated.

The detection circuit 820 may include a first detector 821, a second detector 822, a third detector 823, and a variable threshold circuit 824.

The first detector 821 may compare the first count value CV1 with the first threshold TH1 to generate the first comparison signal SD1. The second detector 822 may generate the second comparison signal SD2 by comparing the second count value CV2 with the second threshold TH2. The third detector 823 may compare the third count value CV3 with the third threshold TH3 to generate the third comparison signal SD3. In addition, the variable threshold circuit 824 may vary the third threshold TH3 based on the first and second comparison signals SD1 and SD2.

Further, the first detector 821 may detect a touch of the first touch sensing member TSM1 based on the first and third comparison signals SD1 and SD3 to generate the first detection signal DF1. The second detector 822 may detect a touch of the second touch sensing member TSM2 based on the second and third comparison signals SD2 and SD3 to generate the second detection signal DF2.

For example, the variable threshold circuit 824 may vary a distance between the force sensing member FSM and the first touch sensing member TSM1, based on the first or second comparison signals SD1 or SD2, or may vary the third threshold TH3 based on the distance between the force sensing member FSM and the second touch sensing member TSM2.

Figure 14:
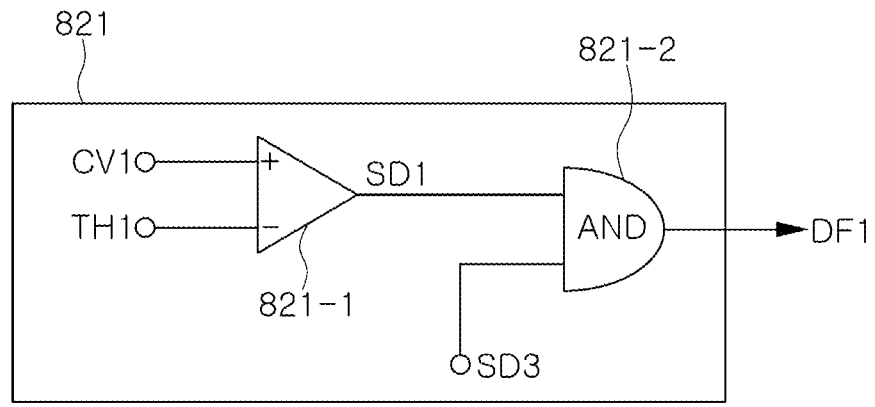
FIG. 14 is a view of a first detector, according to an example.

FIG. 14 is a view of the first detector 821, according to an example.

Referring to FIG. 14, the first detector 821 may include, for example, a first comparator 821-1 and a first AND gate 821-2.

The first comparator 821-1 may generate a high-level first comparison signal SD1 when the first count value CV1 is higher than the first threshold TH1 by comparing the first count value CV1 and the first threshold TH1.

The first AND gate 821-2 may generate the first detection signal DF1 having a high level when both the first comparison signal SD1 and the third comparison signal SD3 have a high level.

Figure 15:
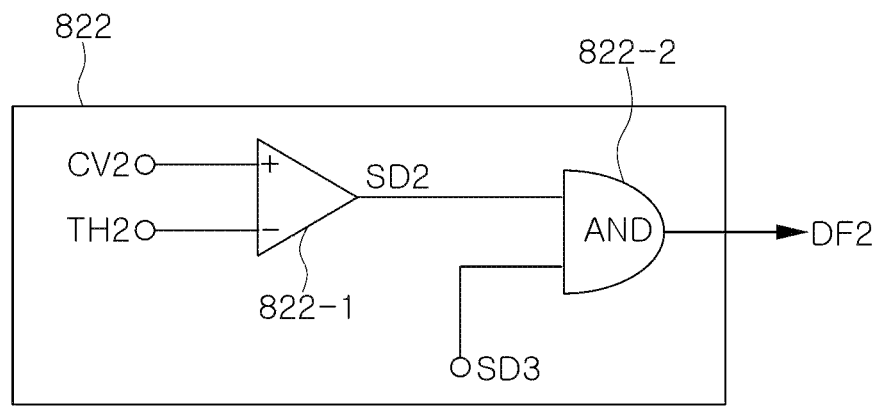
FIG. 15 is a view of a second detector, according to an example.

FIG. 15 is a view of the second detector 822, according to an example.

Referring to FIG. 15, the second detector 822 may include, for example, a second comparator 822-1 and a second AND gate 822-2.

The second comparator 822-1 compares the second count value CV2 and the second threshold TH2. When the second count value CV2 is higher than the second threshold TH2, the second comparator 822-1 may generate the second comparison signal SD2 having a high level.

The second AND gate 822-2 may generate the second detection signal DF2 having a high level when both the second comparison signal SD2 and the third comparison signal SD3 have a high level.

Figure 16:
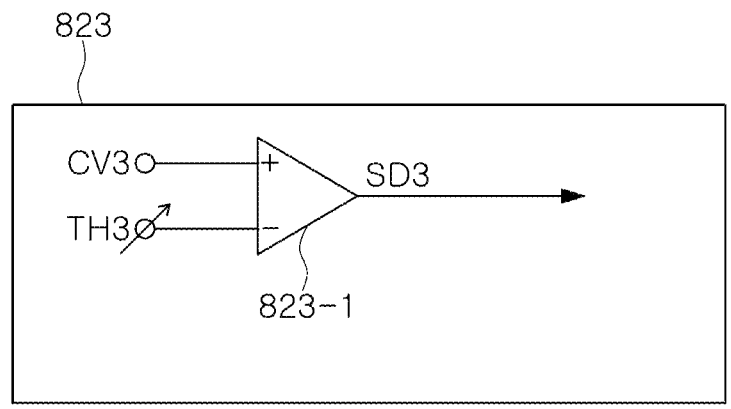
FIG. 16 is a view of a third detector, according to an example.

FIG. 16 is a diagram of the third detector 823, according to an example.

Referring to FIG. 16, the third detector 823 may include, for example, a third comparator 823-1.

The third comparator 823-1 compares the third count value CV3 and the third threshold TH3. When the third count value CV3 is higher than the third threshold TH3, the third comparator 823-1 may generate the third comparison signal SD3 having a high level.

Figure 17:
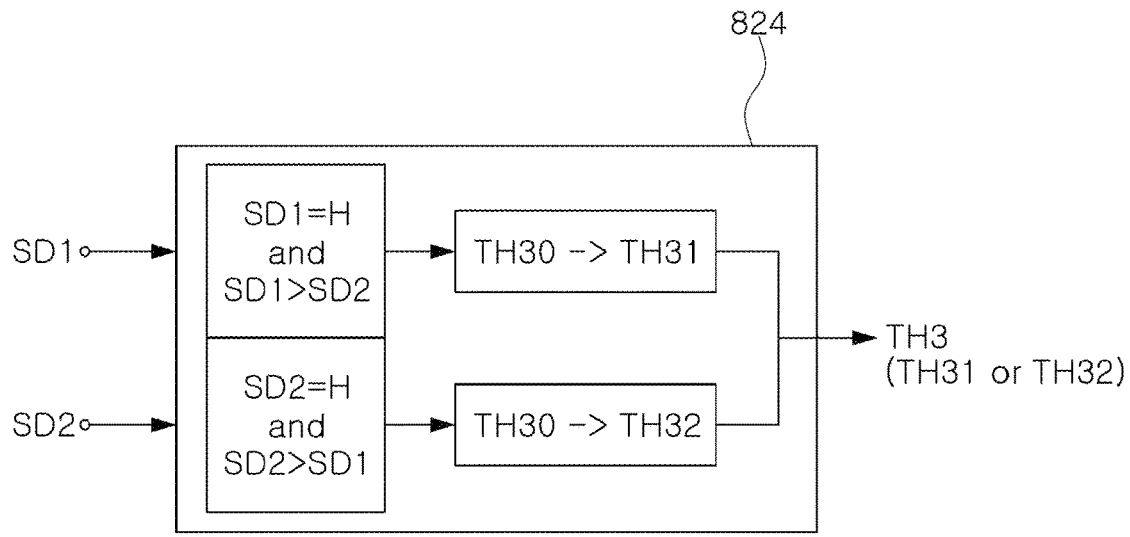
FIG. 17 is a diagram of a variable threshold circuit, according to an example.

FIG. 17 is a diagram of the variable threshold circuit 824, according to an example.

Referring to FIG. 17, variable threshold when the level of the first comparison signal SD1 is greater than the level of the second comparison signal SD2 and the level of the first comparison signal SD1 is a high level, the variable threshold circuit 824 may vary the third threshold TH3 (TH30→TH31) to output the varied third threshold TH31 to the third detector 823.

Alternatively, when the level of the second comparison signal SD2 is greater than the level of the first comparison signal SD1 and the level of the second comparison signal SD2 is a high level, the variable threshold circuit 824 may vary the third threshold TH3 (TH30→TH32) to output the varied third threshold TH32 to the third detector 823.

Figure 18:
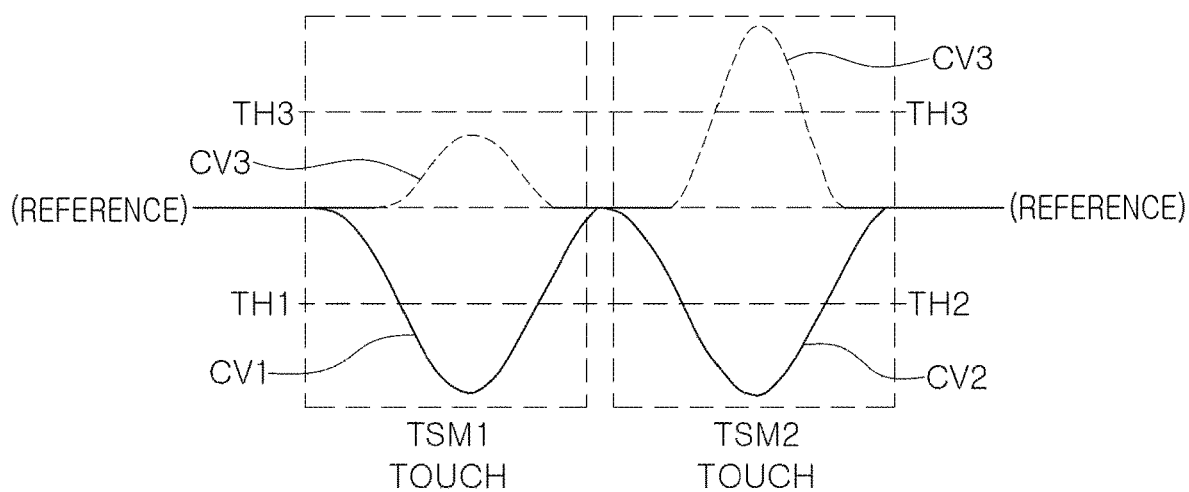
FIG. 18 is an explanatory diagram of the level of a sensing signal for the touch manipulation unit of FIG. 5, according to an example.

FIG. 18 is an explanatory diagram of the level of the sensing signal for the touch manipulation unit TSW of FIG. 5, according to an example.

Referring to FIG. 18, when the first touch sensing member TSM1 is touched, the first count value CV1 is lower than a reference, and the third count value CV3 is lower than the reference. In addition, when the second touch sensing member TSM2 is touched, the first count value CV1 is lower than the reference, and the third count value CV3 is higher than the reference.

In FIG. 5, since the force sensing member FSM is disposed closer to the second touch sensing member TSM2 than to the first touch sensing member TSM1, a third count value CV3 detected when the second touch sensing member TSM2 is touched is greater than a third count value CV3 detected when the first touch sensing member TSM1 is touched.

In this case, since the third count value CV3 detected when the first touch sensing member TSM1 is touched is less than the third threshold TH3, when the third threshold TH3 is not varied, the third count value CV3 is not detected.

In addition, since the third count value CV3 detected when the second touch sensing member TSM2 is touched is much greater than the third threshold TH3, when the third threshold TH is not varied, the third count value CV3 may be detected too sensitively.

Accordingly, it can be seen that the third threshold TH3 should be appropriately varied depending on the touch position to maintain and improve proper sensing sensitivity.

Figure 19:
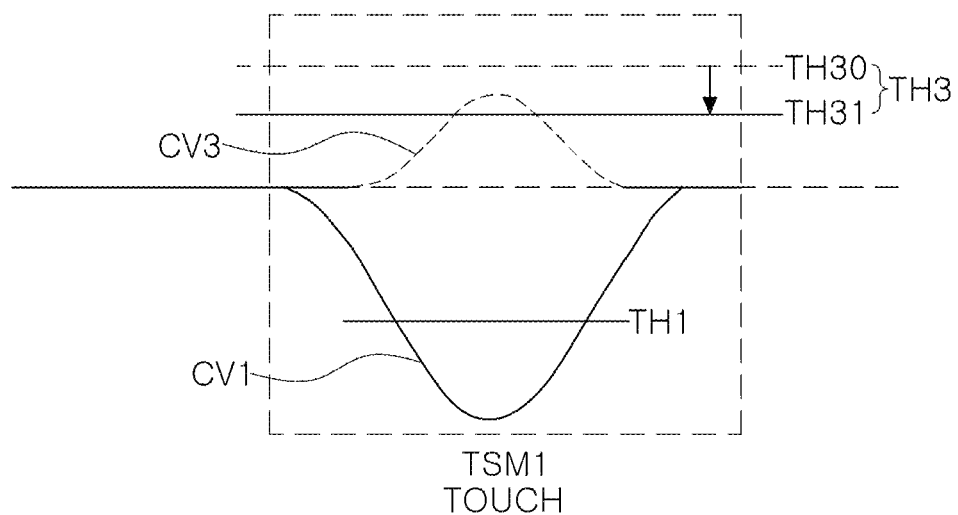
FIG. 19 is an explanatory diagram of a variable third threshold when a first touch sensing member of the touch manipulation unit of FIG. 5 is touched, according to an example.

FIG. 19 is an explanatory diagram of a variable third threshold when the first touch sensing member TSM1 is touched in the touch manipulation unit TSW of FIG. 5, according to an example.

Referring to FIGS. 5, 17, and 19, when the first touch sensing member TSM1 is touched, a third threshold TH30 is varied (TH30→TH31) to allow the third count value CV3 to be detected.

Accordingly, the third count value CV3 may be detected using the varied third threshold TH31.

Figure 20:
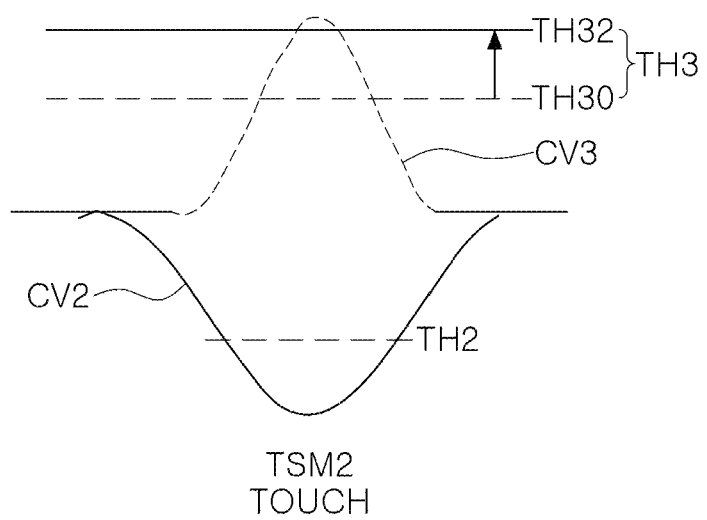
FIG. 20 is an explanatory diagram of a variable third threshold when a second touch sensing member of the touch manipulation unit of FIG. 5 is touched, according to an example.

FIG. 20 is an explanatory diagram of a variable third threshold when the second touch sensing member TSM2 is touched in the touch manipulation unit of FIG. 5.

Referring to FIGS. 5, 17 and 20, when the second touch sensing member TSM2 is touched, the third threshold TH30 is varied (TH30→TH32), such that the third count value CV3 may be appropriately detected. Accordingly, when the variable third threshold TH31 is used, the third count value CV3 may be appropriately detected.

Figure 21:
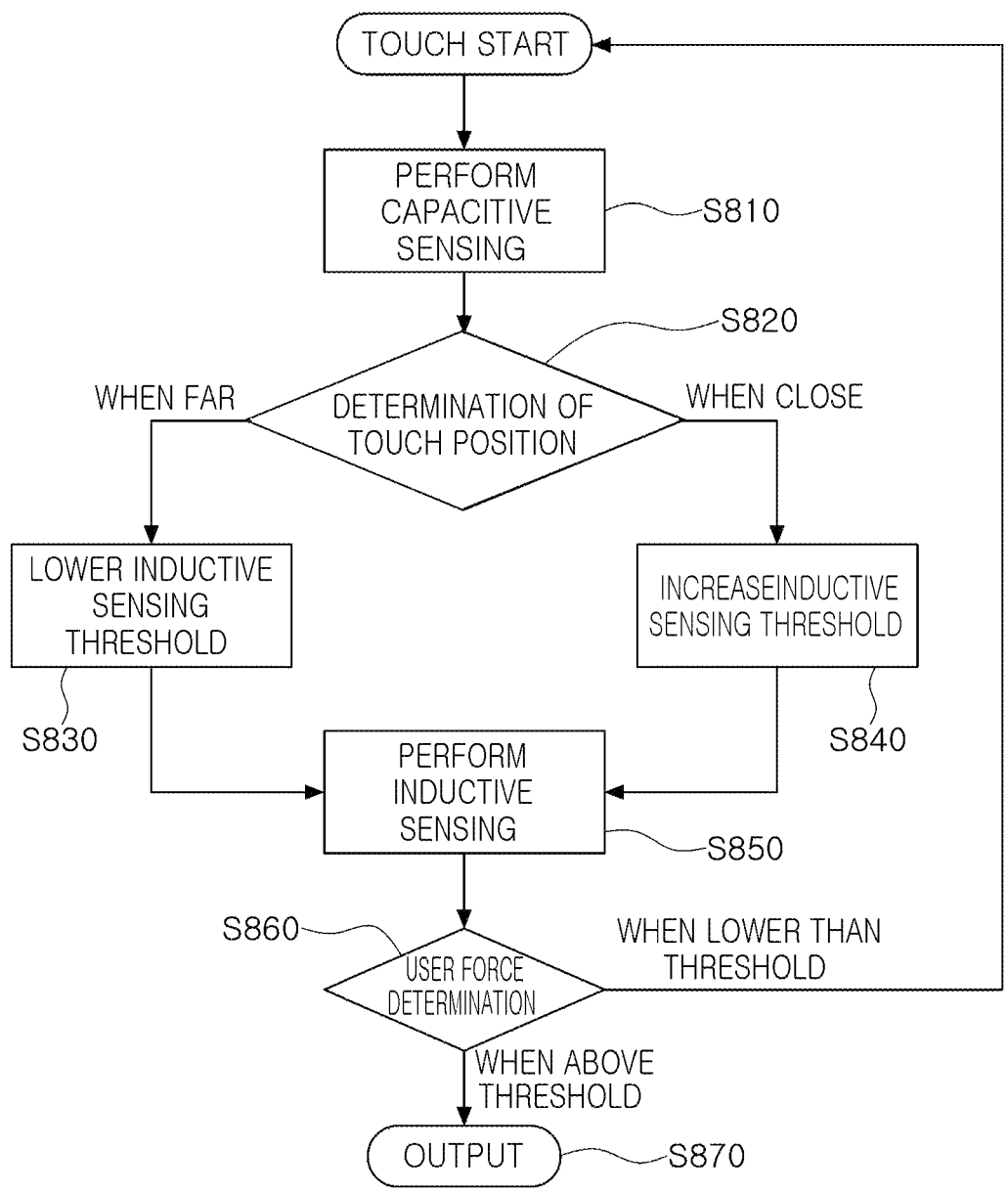
FIG. 21 is a flowchart illustrating an example of an operation process of the touch detection circuit of FIG. 13.

FIG. 21 is a flowchart illustrating an example of an operation process of the detection circuit of FIG. 13.

Referring to FIGS. 13 and 21, touch sensing first starts, capacitive sensing is performed in operation S810, and a touch position is determined based on the capacitive sensing in operation S820. An inductive sensing threshold may be changed according to the touch position determination in operation S830 or operation S840. For example, when the touch position is far from a force sensing member for inductive sensing, the inductive sensing threshold is lowered in operation S830, and, when the touch position is near the force sensing member, the inductive sensing threshold is increased in operation S840.

Thereafter, when pressure is applied, inductive sensing is performed in operation S850, and user force determination is performed in operation S860. When it is determined in operation 860 that the user force detection value is lower than the inductive sensing threshold, touch sensing starts again, and when the user force detection value is higher than the inductive sensing threshold, the signal corresponding to the detection of the force input is output in operation S870.

As described above, in the course of the operation of the detection circuit 820, the threshold value change for force/inductive sensing is based on the distance between a touch position and a force sensing member, and a degree of receiving a pressing force varies depending on the distance, so that the sensing sensitivity is changed. In this case, if the threshold value for the force/inductive sensing is not adjusted, there is a possibility of malfunction (a problem of not working even when pressed strongly or of working when pressed weakly).

The embodiments disclosed herein may compensate for a force/inductive sensing position difference, based on a distance between a touch position and a force/inductive sensing member, by adjusting a threshold for force/inductive sensing.

As set forth above, according to examples disclosed herein, touch sensing sensitivity may be improved by adjusting a sensitivity of inductive sensing of a force sensing unit, depending on a position of a touch sensing member performing capacitive sensing, in a hybrid sensing structure including capacitive sensing and inductive sensing.

The touch manipulation unit TSW, the first touch sensor unit SEN-T1, the second touch sensor unit SEN-T2, the third touch sensor unit SEN-T3, the force sensor unit SEN-F, the first capacitive sensing unit CTSP1, the second capacitive sensing unit CTSP2, the third capacitive sensing unit CTSP3, the inductive sensing unit LTSP, the circuit unit CS, the first converter 811, the second converter 812, the third converter 813, the first detector 821, the second detector 822, the third detector 823 in FIGS. 1-17, and other units, modules, elements, and components that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 21 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media.

Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. In addition, respective embodiments may be combined with each other. For example, the pressing members disclosed in the above-described embodiments may be used in combination with each other in one force sensing device. Therefore, the scope of the disclosure is defined not by the detailed description, but by the claims and their equivalents, and all variations within the scope of the claims and their equivalents are to be construed as being included in the disclosure.

What is claimed is:

1. A touch sensing device being applicable to an electronic device, the electronic device including a touch manipulation unit disposed on a housing, the touch manipulation unit including a first touch sensing member and a second touch sensing member, for capacitive sensing, and a force sensing member for inductive sensing, the touch sensing device comprising:
a first touch sensor device disposed on an internal surface of the first touch sensing member;
a second touch sensor device disposed on an internal surface of the second touch sensing member;
a force sensor device spaced apart from an internal surface of the force sensing member;
an oscillation circuit configured to:
generate a first oscillation signal, based on a change in capacitance in response to the first touch sensing member being touched;
generate a second oscillation signal, based on a change in capacitance in response to the second touch sensing member being touched; and
generate a third oscillation signal, based on a change in inductance depending on a change in spacing between the force sensing member and the force sensor device; and
a touch detection circuit configured to adjust a threshold for force sensing through the force sensor device depending on positions of the first and second touch sensing members, based on the first and second oscillation signals.

2. The touch sensing device of claim 1, wherein the touch detection circuit is further configured to detect a touch through the first touch sensing member or a touch through the second touch sensing member when the force sensing through the force sensor device is performed, based on the first, second, and third oscillation signals.

3. The touch sensing device of claim 2, wherein the touch detection circuit is further configured to:
generate first, second, and third comparison signals corresponding to the first, second, and third oscillation signals, respectively;
adjust a detection level of the third comparison signal by changing a detection threshold of the third comparison signal, based on the first and second comparison signals;
generate a first detection signal, based on the first and third comparison signals; and
generate a second detection signal, based on the second and third comparison signals.

4. The touch sensing device of claim 3, wherein the touch detection circuit is further configured to:
count the first, second, and third oscillation signals to convert the first, second, and third oscillation signals into first, second, and third count values, respectively;
compare the first, second, and third count values with first, second, and third thresholds, respectively, to generate the first, second, and third comparison signals;
vary the third threshold, based on the first and second comparison signals;
generate the first detection signal by detecting a touch of the first touch sensing member based on the first and third comparison signals; and
generate the second detection signal by detecting a touch of the second touch sensing member based on the second and third comparison signals.

5. The touch sensing device of claim 3, wherein the oscillation circuit comprises:

a first oscillation circuit connected to the first touch sensor device and configured to generate the first oscillation signal based on the change in capacitance in response to the first touch sensing member being touched;
a second oscillation circuit connected to the second touch sensor device and configured to generate the second oscillation signal based on the change in capacitance in response to the second touch sensing member being touched; and
a third oscillation circuit connected to the force sensor device and configured to generate the third oscillation signal based on the change in inductance depending on the change in spacing between the force sensing member and the force sensor device.

6. The touch sensing device of claim 3, wherein the touch detection circuit comprises:
a converter circuit configured to count the first, second, and third oscillation signals to convert the first, second, and third oscillation signals into first, second, and third count values, respectively; and
a detection circuit configured to:
compare the first, second, and third count values with first, second, and third thresholds, respectively, to generate first, second and third comparison signals;
vary the third threshold, based on the first and second comparison signals;
generate the first detection signal by detecting a touch of the first touch sensing member based on the first and third comparison signals; and
generate the second detection signal by detecting a touch of the second touch sensing member based on the second and third comparison signals.

7. The touch sensing device of claim 6, wherein the converter circuit comprises:
a first converter configured to count a reference clock signal using the first oscillation signal to generate the first count value;
a second converter configured to count the reference clock signal using the second oscillation signal to generate the second count value; and
a third converter configured to count the reference clock signal using the third oscillation signal to generate the third count value.

8. The touch sensing device of claim 6, wherein the detection circuit comprises:
a first detector configured to compare the first count value with the first threshold to generate the first comparison signal;
a second detector configured to compare the second count value with a second threshold to generate the second comparison signal;
a third detector configured to compare the third count value with the third threshold to generate the third comparison signal; and
a variable threshold circuit configured to vary the third threshold based on the first and second comparison signals,
wherein the first detector is further configured to generate the first detection signal by detecting the touch of the first touch sensing member based on the first and third comparison signals, and
the second detector is further configured to generate the second detection signal by detecting the touch of the second touch sensing member based on the second and third comparison signals.

9. The touch sensing device of claim 8, wherein the third detector comprises a comparator configured to generate the third comparison signal to have a high level, in response to the third count value being higher than the third threshold, by comparing the third count value with the third threshold.

10. The touch sensing device of claim 8, wherein the variable threshold circuit is configured to vary the third threshold based on a distance between the force sensing member and the first touch sensing member or a distance between the force sensing member and the second touch sensing member, based on the first or second comparison signal.

11. The touch sensing device of claim 1, wherein the touch detection circuit is further configured to adjust the threshold for force sensing through the force sensor device depending on a distance between the force sensing member and the first touch sensing member or a distance between the force sensing member and the second touch sensing member, based on the first oscillation signal or the second oscillation signal.

12. An electronic device comprising:
   a housing;
   a touch manipulation unit disposed on the housing and including a first touch sensing member configured for capacitive sensing, a second touch sensing member configured for capacitive sensing, and a force sensing member configured for inductive sensing;
   a first touch sensor device disposed on an internal surface of the first touch sensing member;
   a second touch sensor device disposed on an internal surface of the second touch sensing member;
   a force sensor device spaced apart from an internal surface of the force sensing member;
   an oscillation circuit configured to:
      generate a first oscillation signal, based on a change in capacitance in response to the first touch sensing member being touched;
      generate a second oscillation signal, based on a change in capacitance in response to the second touch sensing member being touched; and
      generate a third oscillation signal, based on a change in inductance depending on a change in spacing between the force sensing member and the force sensor device; and
   a touch detection circuit configured to adjust a threshold for force sensing through the force sensor device depending on positions of the first and second touch sensing members, based on the first and second oscillation signals.

13. The electronic device of claim 12, wherein the touch detection circuit is further configured to detect a touch through the first touch sensing member or a touch through the second touch sensing member when the force sensing through the force sensor device is performed, based on the first, second, and third oscillation signals.

14. The electronic device of claim 13, wherein the touch detection circuit is further configured to:
   generate first, second, and third comparison signals corresponding to the first, second, and third oscillation signals, respectively;
   adjust a detection level of the third comparison signal by changing a detection threshold of the third comparison signal, based on the first and second comparison signals;
   generate a first detection signal, based on the first and third comparison signals; and
   generate a second detection signal, based on the second and third comparison signals.

15. The electronic device of claim 14, wherein the touch detection circuit is further configured to:
   count the first, second, and third oscillation signals to convert the first, second, and third oscillation signals into first, second, and third count values, respectively;
   compare the first, second, and third count values with first, second and third thresholds, respectively, to generate the first, second, and third comparison signals;
   vary the third threshold, based on the first and second comparison signals;
   generate the first detection signal by detecting a touch of the first touch sensing member based on the first and third comparison signals; and
   generate the second detection signal by detecting a touch of the second touch sensing member based on the second and third comparison signals.

16. The electronic device of claim 14, wherein the oscillation circuit comprises:
   a first oscillation circuit connected to the first touch sensor device and configured to generate the first oscillation signal based on the change in capacitance in response to the first touch sensing member being touched;
   a second oscillation circuit connected to the second touch sensor device and configured to generate the second oscillation signal based on the change in capacitance in response to the second touch sensing member being touched; and
   a third oscillation circuit connected to the force sensor device and configured to generate the third oscillation signal based on the change in inductance depending on the change in spacing between the force sensing member and the force sensor device.

17. The electronic device of claim 14, wherein the force sensing member is disposed between the first touch sensing member and the second touch sensing member.

18. The electronic device of claim 14, wherein the second touch sensing member is disposed between the first touch sensing member and the force sensing member.

19. The electronic device of claim 14, wherein the touch detection circuit comprises:
   a converter circuit configured to count the first, second, and third oscillation signals to convert the first, second, and third oscillation signals into first, second and third count values, respectively; and
   a detection circuit configured to:
      compare the first, second, and third count values with first, second, and third thresholds, respectively, to generate first, second and third comparison signals;
      vary the third threshold, based on the first and second comparison signals;
      generate a first detection signal by detecting a touch of the first touch sensing member based on the first and third comparison signals; and
      generate a second detection signal by detecting a touch of the second touch sensing member based on the second and third comparison signals.

20. The electronic device of claim 19, wherein the converter circuit comprises:
   a first converter configured to count a reference clock signal using the first oscillation signal to generate the first count value;
   a second converter configured to count the reference clock signal using the second oscillation signal to generate the second count value; and
   a third converter configured to count the reference clock signal using the third oscillation signal to generate the third count value.

21. The electronic device of claim 19, wherein the detection circuit comprises:
- a first detector configured to compare the first count value with the first threshold to generate the first comparison signal;
- a second detector configured to compare the second count value with the second threshold to generate the second comparison signal;
- a third detector configured to compare the third count value with the third threshold to generate the third comparison signal; and
- a variable threshold circuit configured to vary the third threshold based on the first and second comparison signals,
- wherein the first detector is further configured to generate the first detection signal by detecting the touch of the first touch sensing member based on the first and third comparison signals, and
- the second detector is further configured to generate the second detection signal by detecting the touch of the second touch sensing member based on the second and third comparison signals.

22. The electronic device of claim 21, wherein the third detector comprises a comparator configured to generate the third comparison signal to have a high level, in response to the third count value being higher than the third threshold, by comparing the third count value with the third threshold.

23. The electronic device of claim 21, wherein the variable threshold circuit is further configured to vary the third threshold based on a distance between the force sensing member and the first touch sensing member or a distance between the force sensing member and the second touch sensing member, based on the first or second comparison signal.

24. The electronic device of claim 12, wherein the touch detection circuit is further configured to adjust the threshold for force sensing through the force sensor device depending on a distance between the force sensing member and the first touch sensing member or a distance between the force sensing member and the second touch sensing member, based on the first oscillation signal or the second oscillation signal.

* * * * *